May 29, 1962 C. W. BIESANZ, SR 3,036,567
ROTARY STONE CUTTING SAWS WITH PERIPHERAL DIAMOND
TEETH AND INTERVENING SWEEPER ELEMENTS
Filed July 19, 1961 3 Sheets-Sheet 1
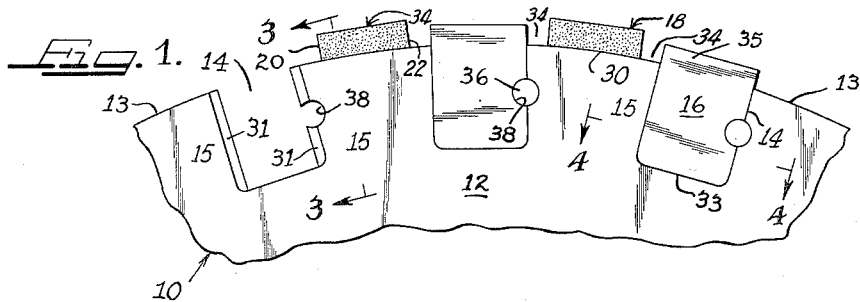
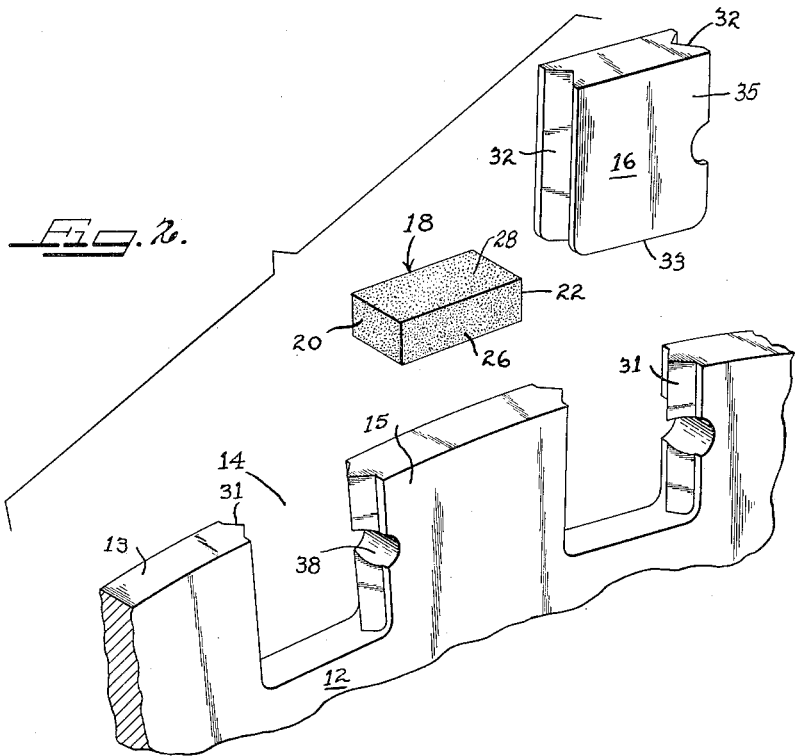
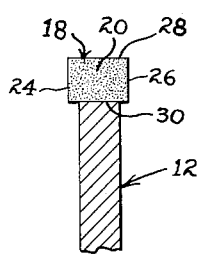
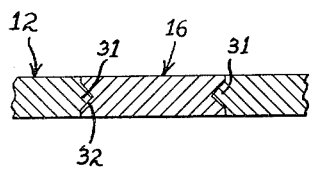
Inventor
CHARLES W. BIESANZ, SR.
by Norman Gerlach
Atty.

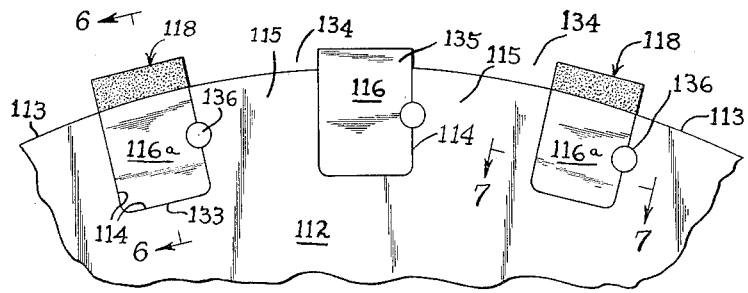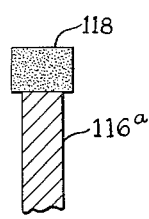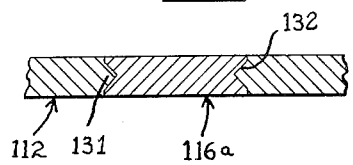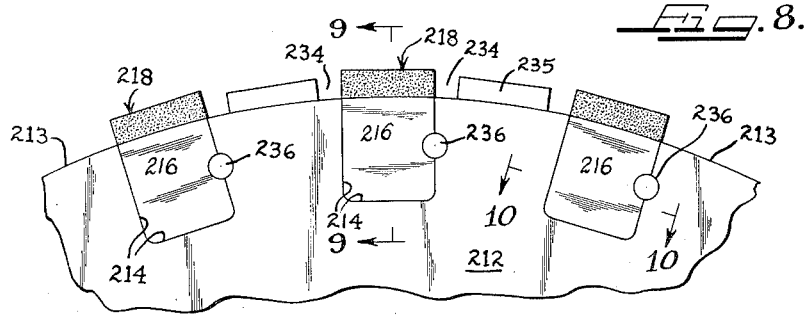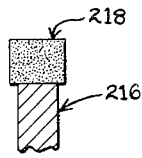

May 29, 1962 C. W. BIESANZ, SR 3,036,567
ROTARY STONE CUTTING SAWS WITH PERIPHERAL DIAMOND
TEETH AND INTERVENING SWEEPER ELEMENTS
Filed July 19, 1961 3 Sheets-Sheet 3

INVENTOR
CHARLES W. BIESANZ, SR.
by
Att.

United States Patent Office 3,036,567
Patented May 29, 1962

3,036,567
ROTARY STONE CUTTING SAWS WITH PERIPHERAL DIAMOND TEETH AND INTERVENING SWEEPER ELEMENTS
Charles W. Biesanz, Sr., Winona, Minn., assignor to Super-Cut, Inc., Chicago, Ill., a corporation of Illinois
Filed July 19, 1961, Ser. No. 125,212
9 Claims. (Cl. 125—15)

The present invention relates to rotary stone cutting saws of the type which is commonly employed for sawing limestone, marble, granite, and the like and embodies for stone cutting purposes a series of peripheral, circumferentially spaced teeth including cutting parts in the form of metallic matrices with diamond particles therein. The invention has particular reference to, and is shown and designed as an improved on, a stone cutting saw of the general type which is shown and described in United States Patent No. 2,589,357, granted on March 18, 1952, to Vincent J. Fantozzi and Leopold H. Metzger and entitled "Diamond Type Tooth for Rotary Stone Cutting Saw."

A stone cutting saw of the type which forms the subject matter of the aforementioned patent comprises a relatively large diameter, flat-sided, disc-like, metallic blade having a series of circumferentially spaced, rectangular, radially extending notches in the periphery thereof. In the notches are tooth assemblies, each of which includes a substantially rectangular metallic tooth body which completely fills the notch to which the assembly is applied. The outer edge of each tooth body projects radially outwardly beyond the notched periphery of the blade and is itself provided with a comparatively wide, circumferentially extending notch in which there is seated and secured as by soldering or brazing an elongated, block-like, cutting part in the form of a diamond-containing, metallic matrix. The outwardly projecting metal of each tooth body defines or constitutes at the ends of the comparatively wide notch a pair of lugs between which the cutting part extends, the leading lug surving to absorb the shock which normally is transmitted to the leading end of the cutting part in connection with saw operation, and also serving to protect the leading end of the cutting part from the abrading action of the sludge which is created by the usual liquid coolant medium and the dislodged particles of abrasion, thereby preventing undercutting or rapid wearing-away of the leading end of the cutting part.

In copending United States patent application Serial No. 51,406, filed on August 23, 1960, by said Leopold H. Metzger, and entitled "Rotary Saw Blade With Peripheral Diamond Teeth and Method of Assembling the Same," there is disclosed another stone cutting saw wherein the milled notches in the periphery of the blade are fitted with rectangular filler or dummy inserts which serve to rigidify the rim region of the blade, the teeth or cutting parts of the saw being soldered or brazed to the peripheral portions of the rim segments of the blade between the notches. Such an arrangement facilitates the manufacture of an original saw as well as the reconditioning of a used saw in that initial application of the teeth or cutting parts directly to the rim of the blade may be accomplished without danger of thermal warping of the rim of the blade since the notches on each side of each region of solder application will effectively block the flow of heat to other regions or portions of the rim, while the subsequent insertion of the dummy inserts into the notches will create the necessary rim rigidity, all as fully set forth in the aforementioned patent application.

Illustrated and described herein are several embodiments of the present invention, all of which represent an improvement over the stone cutting saw of aforesaid Patent No. 2,589,357 and certain of which preserve the rim-rigidifying feature of said copending patent application Serial No. 51,406. The improvement which the present invention offers over the stone cutting saw of said patent resides in the elimination of the aforementioned protective lugs on opposite ends of each cutting part.

Heretofore, the provision of protective lugs on opposite ends of each tooth or cutting part has been considered essential to long tooth life inasmuch as the spaces between adjacent teeth establish collecting pockets for the particles of abrasion. Thus, stone particles loosened by one tooth in effecting a given cut will be struck by the next adjacent trailing tooth and the resultant impact is a contributing factor toward rapid tooth wear. According to the present invention and in all of the forms thereof herein contemplated, the circumferential spacing of teeth on the periphery of the blade is preserved, but instead of employing protective lugs on each end of each tooth or cutting part, a sweeper element in the form of a metallic block is mounted on the periphery of the blade in the space or pocket existing between each adjacent pair of teeth. The sweeper elements are of less circumferential extent than the circumferential extent of the sludge-receiving pockets in which they are disposed and are of less height or radial extent than the height or radial extent of the various teeth. The size of the sweeper elements with respect to the pockets in which they are disposed is appreciably great and, although the elements do not completely fill the pockets, they are of such magnitude that they have a definite churning action and serve to carry the loosened stone particles forwardly in the direction of rotation of the saw, thus reducing to a minimum any impacting force between the particles and the front ends of the trailing teeth. Stated otherwise, the existence of these sweeper elements in the pockets tends to stabilize or render static the entire contents of the pockets with respect to the saw blade and thus, with little or no relative motion between the loosened particles (sludge) and the teeth, the protective lugs are wholly unnecessary. The sweeper elements of the present invention offer additional advantages over conventional stone cutting saws employing circumferentially spaced, diamond-containing, cutting teeth in that the sweeper elements perform a levelling function on the crests of the ridges which are created in the bottom of the kerf by the cutting action of the portions of the diamond particles which protrude from the metallic matrices containing these particles. It is well-known that an abrading or cutting tool will remove material from the work at a greater rate when it encounters a smooth or flat surface than when it encounters a ribbed surface, especially when the ribs are in the direction of the cutting action. Thus, by providing between adjacent teeth sweeper elements which are but a few thousandths of an inch less in height than the teeth, the elements, in connection with use of the saw, perform a truncating operation upon the ridges or ribs created by the teeth which immediately precede them, thus levelling the bottom of the kerf so that the teeth which follow or succeed these sweeper elements will operate upon a substantially flat surface.

Finally, the sweeper elements perform a third useful function in that they operate in the manner of slingers to throw the sludge resulting from the cutting action radially outwardly of the saw blade and thus clean or purge the pockets during a sawing operation.

The provision of a rotary stone cutting saw having sweeper elements of the character and for the purpose heretofore mentioned being the principal object of the present invention, other objects and advantages will readily suggest themselves as the following description ensues.

In the accompanying three sheets of drawings forming a part of this specification, several embodiments of the invention have been illustrated.

In these drawings:

FIG. 1 is a fragmentary side elevational view of a preferred form of rotary stone cutting saw constructed and assembled according to the present invention;

FIG. 2 is an enlarged exploded perspective view of a portion of the saw of FIG. 1;

FIG. 3 is a sectional view taken on the line 3—3 of FIG. 1;

FIG. 4 is a sectional view taken on the line 4—4 of FIG. 1;

FIG. 5 is a fragmentary side elevational view similar to FIG. 1 but showing a modified form of rotary stone cutting saw embodying the invention;

FIG. 6 is a sectional view taken on the line 6—6 of FIG. 5;

FIG. 7 is a sectional view taken on the line 7—7 of FIG. 5;

FIG. 8 is a fragmentary side elevational view similar to FIGS. 1 and 5 but showing another modified form of rotary stone cutting saw embodying the invention;

FIG. 9 is a sectional view taken on the line 9—9 of FIG. 8;

FIG. 10 is a sectional view taken on the line 10—10 of FIG. 8;

Figure 11:
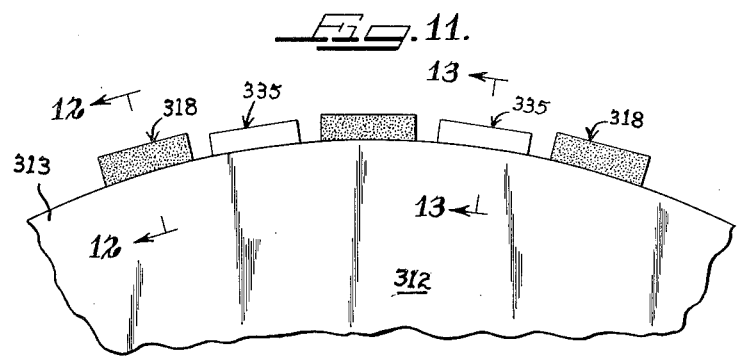
FIG. 11 is a fragmentary side elevational view similar to FIGS. 1, 5 and 8 but showing still another modified form of rotary stone cutting saw embodying the invention.

Referring now to the drawings in detail and in particular to FIGS. 1 to 4, inclusive, only a fragment of the peripheral regions of a rotary saw for cutting stone and the like has been shown, and it is designated in its entirety by the reference numeral 10. The saw blade 12 is in the form of a relatively large, comparatively thin, flat-sided, disc-like member which is formed of steel or other suitable metal. The narrow cylindrical outer rim 13 of the blade 12 is interrupted by a series of equally spaced, substantially rectangular notches 14 which extend radially inwardly of the blade periphery and define therebetween intervening rim sections 15. These notches are each filled with a metallic insert 16, the nature and function of which will be set forth presently.

Mounted on the central portions of the peripheries of the rim sections 15 between adjacent pairs of notches 14 are saw teeth 18, each tooth being in the form of a metallic matrix containing diamonds, preferably crushed or fragmented diamonds, which are distributed substantially uniformly throughout the matrix. Each tooth 18 is generally of rectangular, block-like design, which is to say, it is in the form of a right angle hexahedron having end faces 20 and 22, side faces 24 and 26, an outside face 28, and an inside face 30. The inside faces of the teeth are curved or arcuate in conformity with the curvature of the peripheral portions of the rim sections 15 of the blade 12 in order that they will fit in a flat manner against the rim sections. The width of the teeth is in excess of the thickness of the saw blade 12 with the result that the side faces of the teeth overhang the rim of the blade on opposite sides, as clearly shown in FIG. 2. Since the teeth 18 project radially outwardly beyond the narrow cylindrical rim and since they are disposed in circumferentially spaced relationship, they will, during operation of the saw, engage the stone or other material undergoing sawing, while at the same time, a suitable combined liquid coolant and flushing media is applied to the work in the usual manner of operation of a stone cutting saw of the type under consideration.

The notches 14 are generally of square configuration and the radially extending side edges thereof are double bevelled in such a manner that they form inwardly extending ribs 31 of V-shape cross section. Each insert 16 is of greater radial extent than the depth of its respective notch 14 but otherwise, it is shaped conformably to, and fits within, its respective notch 14 in such a manner as to fill the same completely. Accordingly, the side edges of each insert 16 are formed therealong with dovetail grooves 32 which serve to receive the ribs 31 with a tight friction fit. The inside or inner end edge 33 of each insert 16 meets the lower edge or bottom of the associated notch 14 in coextensive edge-to-edge relationship. Due to the additional radial extent of the inserts as mentioned above, the outer regions or ends of the inserts project outwardly beyond the rim 13 and extend into the spaces or pockets 34 which exist between the teeth on the rim of the blade 12. The projecting or exposed outer ends of the inserts constitute sweeper elements 35, the function and purpose of which will be described in detail hereafter.

The inserts 16 are driven or pressed into their respective notches 14 with a tight fit so that the entire rim of the blade is placed under compression and, therefore, is rigid. Each insert is retained in position by a key-type rivet 36 which extends through a circular hole 38. One-half of the hole is formed in one side margin of the insert and the other half of the hole is formed in the adjacent side edge of the notch 14.

In assembling the saw 10 of FIGS. 1 to 4, inclusive, the installation procedure which is set forth in aforementioned patent application Serial No. 51,406 is followed in that the blade blank is first notched to provide the series of circumferentially spaced notches 14, and the teeth 18 are then soldered or brazed by the application of heat to the peripheries of the rim sections 15 of the blade. The unfilled notches 14 constitute voids which afford the necessary degree of heat dissipation during the application of heat to the rim sections 15 so that there will be no buckling or warping of the rim 13 of the blade. Finally, the inserts 16 are driven or pressed into the notches, and this filling-in of the notches with the inserts 16 compresses the metal of the rim of the blade and places the blade under the proper degree of tension so that there will be no fluttering of the rim when the saw is put into service.

The radial extent or height of the teeth 18 is slightly greater than the radial extent or height of the sweeper elements 35 which, as heretofore mentioned, are formed by the outwardly projecting or exposed outer ends of the inserts 16. Preferably, and for reasons that will be made clear presently, the extent to which each sweeper element projects radially outwardly beyond the rim 13 is but a few thousandths of an inch less than the radial extent of the teeth 18. Actually, the relative difference in radial extent between the sweeper elements and teeth is a function of diamond particle size.

The sweeper elements 35 partially, but not completely, fill the pockets 34 between the teeth 18 on the rim of the saw blade. As shown in the drawings, the ends of the sweeper elements 35 are spaced equidistantly from the ends of the teeth 18. In the operation of the stone cutting saw 10, the teeth successively cut into and enter the stone or other material undergoing sawing and whenever two or more teeth are embedded in the material, each pair of adjacent teeth and the side walls and bottom of the kerf which is created by the cutting action define a closed cavity which moves bodily forwardly along the kerf in conformity with the rate of peripheral speed of the saw. enclosed within this closed moving cavity is one of the aforementioned sweeper elements and this sweeper element also moves bodily with the cavity and thus serves to stabilize the sludge (coolant and loosened stone particles) within the cavity. By reason of this phenomenon, the entire contents of each closed cavity including the coolant and entrained particles are swept, so to speak, along with the periphery of the saw blade and thus, since their peripheral speed is substantially the same as the peripheral speed of the teeth 18, they are prevented from impact against the teeth. In this manner, the leading end faces 20 of the teeth are effectively protected against the adverse effect of abrasion which, in the present instance, is practically nonexistent. By such an arrangement, the necessity of providing shielding and shock-absorbing lugs or the like at the ends of the teeth 18 is obviated.

Figure 14:
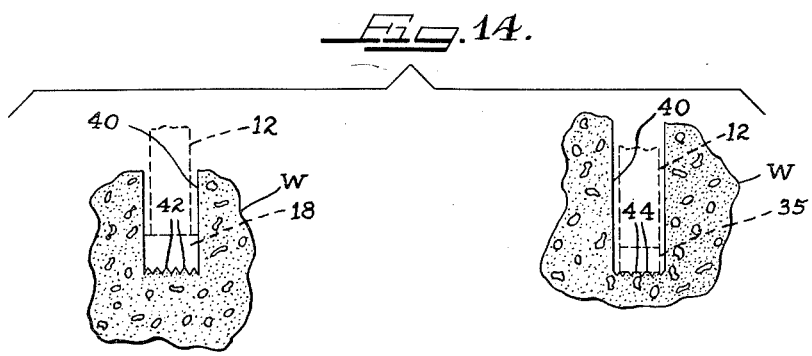
FIG. 14 is a schematic view illustrating certain abrasive phenomena in connection with the invention.

Another and important function of the sweeper elements 35 resides in their limited abrasive action on the bottom wall of the kerf undergoing cutting by the diamond cutting teeth 18. This function has been schematically illustrated in FIG. 14 where, at the left-hand side of the view, the bottom wall of the kerf 40 which is formed in the stone or other work W is provided with a series of ridges 42. The latter are left by the passage of diamond particles longitudinally along the kerf during normal operation of the saw 10. The illustration of these ridges 42 is exaggerated in the disclosure, but for purposes of discussion, if it is assumed that the extent to which the diamond particles protrude from the face of the metallic matrices is on the order of 0.005", then the height of the various ridges will, of course, be on the same order. Now, assuming that the radial extent of the sweeper elements 35 is 0.001" less than the over-all height of the teeth 18, as each sweeper element traverses the bottom wall of the kerf following the cutting action of the preceding tooth 18, it will engage the various ridges 42, as shown at the right-hand side of FIG. 14, and truncate the ridges as shown, leaving flats 44 which are only 0.001" in height above the extreme bottom of the kerf 40. Thus, a comparatively smooth or flat surface is provided for engagement by the next following succeeding cutting tooth 18. Since the projecting diamond particles of such succeeding tooth 18 will not be encumbered by having to remove the previously-formed ridges 42, but will have a substantially fresh flat surface upon which to operate, it is obvious that the sweeper elements, apart from the minor abrasive action which they themselves perform, very materially increase the efficiency of the cutting teeth 18.

Finally, the various sweeper elements 35 perform a slinging action and serve to remove sludge from the pockets 35 between the cutting teeth 18. As the teeth emerge from the kerf, the sweeper elements function as slingers to throw the sludge radially outwardly and relieve the peripheral regions of the saw body from clinging sludge as well as to purge the pockets 34 of sludge. The sweeper elements thus have a cleansing action which prevents the flow of sludge onto the operating faces of the diamond teeth or segments and prevents clogging thereof in the manner in which a sheet of sandpaper may become clogged when used on a moist or oily surface.

In FIGS. 5, 6 and 7 of the drawings, a first modified form of rotary stone cutting saw is illustrated, this form of the invention retaining the rim-rigidifying features of the hereinbefore mentioned patent application Serial No. 51,406, as well as affording sweeper elements between adjacent cutting teeth to inhibit particle or sludge impact on the leading end faces of the teeth as previously described in connection with the form of the invention which is shown in FIGS. 1 to 4, inclusive. In order to avoid needless repetition of description, similar reference numerals of a higher order have been applied to the corresponding parts as between FIGS. 1 to 4, inclusive, and FIGS. 5 to 7, inclusive. The first modified form of rotary stone cutting saw, i.e., the saw which is illustrated in FIGS. 5 to 7, inclusive, comprises a comparatively thin, flat-sided, disc-like, metallic blade 112, the rim region 113 of which is provided with an annular series of equidistantly spaced, substantially rectangular, notches 114. The latter extend inwardly from the periphery of the rim region 113. In addition to the blade 112, the saw of FIGS. 5 to 7, inclusive, comprises an annular series of long inserts 116, an annular series of short inserts 116a, and cutting teeth 118. The long inserts 116 are mounted in every other notch 114 and have the outer ends thereof projecting beyond the periphery of the rim region so as to form sweeper elements 135. The short inserts 116a are mounted in, and serve to fill, the alternate notches 114 and have the outer edges thereof flush with, and forming smooth continuations of, the peripheral portions of the rim sections 115 between the notches 114. The cutting teeth 118 are similar to the cutting teeth 18 of the saw of FIGS. 1 to 4, inclusive, and have the inside faces thereof soldered or brazed to the outer edges of the short inserts 116a. The sweeper elements 135 on the outer ends of the long inserts 116 function in the same manner, and serve the same purpose as, the sweeper elements 35 of the rotary stone cutting saw of FIGS. 1 to 4, inclusive. The ends of the sweeper elements 135 are spaced equidistantly from the ends of the teeth 118 as shown in the drawings.

In FIGS. 8, 9 and 10, a second modified form of rotary stone cutting saw is shown, this form also affording sweeper elements between adjacent cutting teeth. Again, to avoid needless repetition of description, similar reference numerals but of a still higher order have been applied to the corresponding parts as between FIGS. 5 to 7, inclusive, and FIGS. 8 to 10, inclusive. In the second modified form of saw, the inserts 216a with their applied diamond cutting teeth 218 remain substantially the same as in the form of the invention shown in FIGS. 5 to 7, inclusive. Each of the notches 214 in the peripheral region or rim 213 is filled with one of the inserts 216a. The sweeper elements 235 are afforded by the provision of separate, generally rectangular, block-like steel bodies which are soldered or brazed to the rim 213 of the saw body 212 between the teeth 218. The ends of these block-like bodies are preferably equidistantly spaced from the end faces of the teeth 218. The sweeper elements 235 and the teeth 218 function in the same manner and serve the same purpose as the sweeper elements 35 and 135 and the teeth 18 and 118.

Figures 12, 13:
FIG. 12 is a sectional view taken on the line 12—12 of FIG. 11.
FIG. 13 is a sectional view taken on the line 13—13 of FIG. 11.

In FIGS. 11, 12 and 13, a third modified form of rotary stone cutting saw embodying the invention is shown. Again, using reference numerals of a higher order to designate corresponding parts, the saw blade 312 of the saw of FIGS. 11 to 13, inclusive, is not notched in the peripheral or rim region 313 thereof. The blade 312 has associated therewith in addition, an alternating series of block-like bodies which form sweeper elements 335. The teeth 318 and the sweeper elements 335 are soldered or brazed to the edge or periphery of the rim 313 of the saw blade 312, such teeth and cutting elements being arranged in alternate and spaced relationship and functioning in the same manner as the teeth 18, 118 and 218, and the sweeper elements 35, 135 and 235.

In each of the four forms of the invention illustrated herein, the height of the sweeper elements, i.e., the extent to which they project radially outwardly beyond the rim of the saw blade, is slightly less than the height of the intervening teeth. Preferably, the dimensional relationship which is set forth in connection with the teeth 18 and the sweeper elements 35 of the saw of FIGS. 1 to 4, inclusive, is preserved of the same for the teeth and sweeper elements of the three modifid saws embodying the invention.

The invention is not to be understood as restricted to the details set forth since these may be modified within the scope of the appended claims without departing from the spirit and scope of the invention.

Having thus described the invention what I claim as new and desire to secure by Letters Patent is:

1. In a saw of the character described for cutting stone and like material, a flat-sided, disc-like blade having a circular rim, a series of circumferentially spaced, radially extending, cutting teeth mounted fixedly with respect to said blade and in the peripheral regions thereof and projecting radially outwards beyond said rim a predetermined distance, each of said cutting teeth comprising a metallic matrix containing diamond particles which project beyond the outer working face of the matrix, and a series of sweeper elements mounted fixedly with respect to said blade and in the peripheral regions thereof and projecting outwardly beyond said rim a distance slightly less than said predetermined distance, each sweeper element being disposed in one of the pockets between adjacent cutting teeth, and having its ends opposing and spaced from the adjacent ends of said adjacent cutting teeth.

2. In a saw of the character described for cutting stone and like material, a flat-sided, disc-like blade having a circular rim, a series of circumferentially spaced, radially extending, cutting teeth mounted fixedly with respect to said blade and in the peripheral regions thereof and projecting radially outwards beyond said rim a predeterminted distance, each of said cutting teeth comprising a metallic matrix containing diamond particles which project beyond the outer working face of the matrix, and a series of sweeper elements mounted fixedly with respect to said blade and in the peripheral regions thereof and projecting outwardly beyond said rim a distance slightly less than said predetermined distance, each sweeper element being disposed in one of the pockets between adjacent cutting teeth, and having its ends opposing and spaced from the adjacent ends of said adjacent cutting teeth, the difference in radial extent of said cutting teeth and sweeper elements being less than the distance to which said diamond particles project outwardly beyond the working faces of the matrices of the teeth.

3. In a saw of the character described for cutting stone and like material, a flat-sided, disc-like, metallic blade having a circular rim, a series of equally and circumferentially spaced, radially extending, cutting teeth mounted on said blade in the peripheral regions thereof and projecting radially outwardly beyond said rim a predetermined distance, each of said cutting teeth consisting of a metallic matrix containing diamond particles which project beyond the outer working face of the matrix, and a metallic sweeper element mounted on said blade in the peripheral region thereof and interposed between the adjacent ends of each pair of adjacent cuting teeth and spaced from said adjacent ends, said sweeper element projecting outwardly beyond said rim a distance slightly less than said predetermined distance.

4. In a saw of the character described for cutting stone and like material, a flat-sided, disc-like blade having a circular rim, a series of circumferentially spaced, radially extending, cutting teeth mounted fixedly with respect to said blade and in the peripheral regions thereof and projecting radially outwards beyond said rim a predetermined distance, each of said cutting teeth comprising a metallic matrix containing diamond particles which project beyond the outer working face of the matrix, and a series of sweeper elements mounted fixedly with respect to said blade and in the peripheral regions thereof and projecting outwardly beyond said rim a distance slightly less than said predetermined distance, each sweeper element being disposed in one of the pockets between adjacent cutting teeth, and having its ends opposing and spaced from the adjacent ends of said adjacent cutting teeth, the difference in radial extent of said cutting teeth and sweeper elements being less than the distance to which said diamond particles project outwardly beyond the working faces of the matrices of the teeth.

5. In a segmental saw of the character described for cutting stone and like material, a flat-sided, circular, disc-like, metallic blade having a circular rim which is interrupted by a circumferentially extending series of spaced apart, radially extending, peripheral notches which define therebetween intervening arcuate rim sections, a cutting tooth mounted on the peripheral portion of each rim section, comprising a metallic matrix containing diamond particles, and bonded to said peripheral portion, said cutting tooth being of predetermined radial height and of a width slightly greater than the thickness of the blade, the side margins of said tooth overhanging said rim laterally on opposite sides thereof, and a metallic insert in the form of a flat plate of a width equal to the width of the blade, fitting in and filling each notch and serving, in effect, to rigidify the rim region of the blade, said insert projecting radially outwardly of its associated notch beyond the rim a distance slightly less than the radial height of the cutting teeth and forming a sweeper element.

6. In a segmental saw of the character described for cutting stone and like material, a flat-sided, disc-like, metallic blade having a circular rim which is interrupted by a circumferentially extending series of spaced apart, radially extending, peripheral notches which define therebetween intervening arcuate rim sections, a metallic insert in the form of a flat plate of a width equal to the width of the blade, fitting in and filling each notch, said inserts serving, in effect, to render the rim region of the blade continuous and to place the same under uniform compression throughout, a block-like cutting tooth in the form of a metallic matrix with diamond particles therein, mounted on the outer end of each of said inserts and projecting radially outwardly beyond the rim of the blade a predetermined distance, and a sweeper element in the form of a generally rectangular metallic block bonded to the peripheral portion of each arcuate rim section and projecting radially outwardly beyond the rim of the blade and between the adjacent pair of teeth a distance slightly less than said predetermined distance, the opposite ends of each sweeper element being spaced from and opposing the adjacent ends of the adjacent teeth.

7. In a segmental saw of the character described for cutting stone and like material, a flat-sided, disc-like, metallic blade having a circular rim which is interrupted by a circumferentially extending series of spaced apart, radially extending, peripheral notches which define therebetween intervening arcuate rim sections, a first series of metallic inserts in the form of flat plates of a width equal to the width of the blade, fitting in and filling only every other notch, a block-like cutting tooth bonded to the outer end of said inserts and comprising a metallic matrix with diamond particles therein, said cutting tooth projecting radially outwardly a predetermined distance beyond said rim, and a second series of metallic inserts in the form of flat steel plates of a width equal to the width of the blade, fitting in and filling the alternate notches and projecting radially outwardly beyond said rim a distance slightly less than said predetermined distance in order to form sweeper elements.

8. In a saw of the character described for cutting stone and like material, a flat-sided, disc-like, metallic blade having a circular rim, an annular series of circumferentially spaced, radially extending, cutting teeth bonded to said rim and projecting radially outwardly beyond the rim a predetermined distance, each of said cutting teeth consisting of a metallic matrix containing diamond particles which project beyond the outer working face of the matrix, the width of said matrix being greater than the thickness of the blade whereby the matrix overhangs said rim on opposite sides thereof, and an annular series of circumferentially spaced, radially extending, metallic sweeper elements bonded to said rim and projecting radially outwardly beyond the rim a distance slightly less than said predetermined distance, said cutting teeth and sweeper elements being disposed in alternate fashion around the circular rim with each end of each sweeper element being spaced from and opposing an end of an adjacent cutting tooth.

9. A saw according to claim 8 and wherein the transverse width of each sweeper element is substantially equal to the thickness of said blade.

No references cited.